United States Patent
Kron

(10) Patent No.: US 11,873,464 B2
(45) Date of Patent: Jan. 16, 2024

(54) PAINT BRUSH CLEANING AND GUM REMOVER COMPOSITION COMPRISING ISOPROPYLAMINE ALKYLBENZENESULFONATE

(71) Applicant: Herman Kron, Metairie, LA (US)

(72) Inventor: Herman Kron, Metairie, LA (US)

(*) Notice: Subject to any disclaimer, the term of this patent is extended or adjusted under 35 U.S.C. 154(b) by 238 days.

(21) Appl. No.: 17/398,757

(22) Filed: Aug. 10, 2021

(65) Prior Publication Data

US 2023/0046141 A1 Feb. 16, 2023

(51) Int. Cl.
| | |
|---|---|
| *C11D 1/22* | (2006.01) |
| *C09D 9/04* | (2006.01) |
| *C11D 11/00* | (2006.01) |
| *C11D 17/00* | (2006.01) |
| *C11D 3/43* | (2006.01) |

(52) U.S. Cl.
CPC ............ *C11D 1/22* (2013.01); *C09D 9/04* (2013.01); *C11D 3/43* (2013.01); *C11D 11/0023* (2013.01); *C11D 17/003* (2013.01)

(58) Field of Classification Search
CPC ......... C11D 1/22; C11D 3/188; C11D 3/2037; C11D 3/2093; C11D 3/43; C11D 7/266; C11D 7/3254; C11D 7/5004; C11D 7/5022; C11D 17/043; C11D 17/003
See application file for complete search history.

(56) References Cited

U.S. PATENT DOCUMENTS

| | | | |
|---|---|---|---|
| 4,780,235 A | 10/1988 | Jackson | |
| 5,985,812 A * | 11/1999 | Ehrenkrona | C11D 1/667 106/311 |
| 7,018,969 B1 * | 3/2006 | Gross | C11D 3/2093 510/238 |
| 9,249,378 B2 | 2/2016 | DeWit et al. | |
| 2006/0094601 A1 * | 5/2006 | Hazen | A01N 25/30 504/344 |
| 2010/0137182 A1 * | 6/2010 | Lallier | C09D 9/005 510/201 |
| 2017/0339947 A1 * | 11/2017 | Bramati | A01N 25/30 |

\* cited by examiner

*Primary Examiner* — Charles I Boyer

(74) *Attorney, Agent, or Firm* — Norton IP Law Firm LLC; Taylor M. Norton

(57) ABSTRACT

Cleaning compositions and methods of making and using the same are provided. The cleaning composition includes an ethyl or methyl ester of a vegetable oil and an emulsifying agent consisting of isopropylamine alkylbenzene sulfonate. The cleaning compositions of the present invention are useful in a variety of domestic or industrial applications including removal of paint from paint brushes, removal of chewing gum from surfaces, and removal of graffiti from surfaces.

15 Claims, No Drawings

PAINT BRUSH CLEANING AND GUM REMOVER COMPOSITION COMPRISING ISOPROPYLAMINE ALKYLBENZENESULFONATE

FIELD OF THE INVENTION

The present invention generally relates to a cleaning composition, and more particularly to compositions for the removal of paint from paint brushes and the removal of chewing gum from surfaces. The invention further relates to a method of making and using such compositions.

BACKGROUND OF THE INVENTION

Cleaning compositions are useful for removing dirt and other foreign matter from various surfaces and objects. Many commercially-available cleaning compositions include simple soaps prepared by saponification of oil; a combination of organic solvents, water, and optional ingredients such as surfactants, colorants, fragrances, and the like. However, the cleaning compositions available in the prior-art for household, industrial, or institutional use, are faced with the task of optimizing the cleaning formulations by selecting a solvent that exhibits excellent cleaning performance, but that causes minimum adverse effects on the user and the environment.

Paint is a composition that can be converted to a solid film after application to a substrate in a thin layer. Conventional paint consists of a pigment, carrier, and a binder. Pigment, or tint, is the coloring agent that remains visible after paint cures. The carrier is the solution that the binder is suspended in, which keeps the binder in liquid form until it is applied to the substrate. Once applied and exposed to air, the carrier either evaporates or chemically bonds through oxidative cross-linking to the painted surface. The binder is the film-forming component of paint that imparts adhesion between the paint and the surface. The binder also influences such properties as gloss, durability, flexibility, and toughness. Binders are categorized according to the mechanisms for drying or curing, with the most common type being water-based, otherwise known as latex paint. Latex paint binders are dispersed in the carrier in the form of small insoluble resin particles, thereby creating a colloidal suspension.

The compositions or products of prior-art dissolve or soften the polymers (or binders), however, since the solvent cannot be washed from the brushes and equipment, the polymers and solvent remain in some quantity on the objects like brushes, hardening the bristles and leaving them unable to hold paint or to allow the brushes to paint in fine detail. The flexibility is hampered as polymers harden and fine bristles of the brushes and equipment are slicked down and glued together by the polymers and binding agents.

Further, the ability to suspend oil and water-soluble polymers in water is unique. Generally, oil-soluble polymers do not disperse in water. Though higher molecular weight solvent-based systems may dissolve these polymers, however, they destroy the synthetic and natural bristle of brushes and the equipment that sprays paint. Furthermore, water-based cleaners are generally not useful for dissolving or softening polymers.

There are very few non-toxic solvents and even fewer that have no fumes. Conventional paint and lacquer thinners, and even conventional biodiesel, have been used to clean brushes, but all of them leave both polymer residues and solvent behind. The conventional biodiesel solvents don't evaporate easily and hence contaminate the "cleaned" paint brushes, and therefore any new paint that contacts the "cleaned" paint brushes becomes contaminated with the solvents.

Many cleaning compositions have been developed over the years in an effort to remove paint or gum from surfaces. These include compositions that have been patented and published in patent application publications.

Ehrenkrona, U.S. Pat. No. 5,985,812 discloses a method of cleaning paint brushes from wet or dry paint or removing paint from painted surfaces.

Jackson, U.S. Pat. No. 4,780,235 discloses a low toxicity paint remover composition containing C to C dialkyl esters of C to C aliphatic dibasic acid, an activator, a thickener, a surfactant, and at least one other organic nonhalogen-containing solvent.

Wit, U.S. Pat. No. 9,249,378 discloses a non-toxic cleaning composition comprising water and an organic solvent which is effective at removing both hydrophobic and hydrophilic content from a wide range of substrate types, including metal, glass, painted wall board, vinyl, concrete, and many others.

There is still a need for a cleaning composition that would be effective to remove a variety of undesirable substances from a wide range of substrates. There is a need for a cleaning composition that would more effectively remove paint from paint brushes and paint rollers and other equipment and surfaces as well as more effectively facilitate removal of the cleaning composition from the paint brushes and paint rollers and other equipment and surfaces. Further, there is a need for cleaning compositions that are manufactured in a cost-effective manner and on a commercial scale.

An object of the disclosed invention is to provide cleaning compositions that more efficiently and effectively remove wet and dried paint from paint brushes and paint rollers and equipment and other surfaces. Another object of the present invention is to provide cleaning compositions that themselves are more efficiently and effectively removed from the paint brushes and paint rollers and other surfaces by mere rinsing with water, in order to provide for better cleaned and better reusable paint brushes and rollers and other equipment and surfaces.

SUMMARY OF THE INVENTION

The present invention provides cleaning compositions comprising an isopropylamine alkylbenzene sulfonate, a methyl or ethyl ester of a vegetable oil, and water. The disclosed compositions are used to remove wet and dried paint from paint brush bristles and paint rollers and other surfaces. The disclosed compositions are also used to efficiently remove label adhesives, chewing gum residues, waxes, and silicones from surfaces of objects in a multitude of environments.

In one embodiment, a composition is provided to the removal of paint from paint brush bristles and paint rollers, where the composition consists of 5-20% by weight of isopropylamine alkylbenzene sulfonate; 70-95% by weight of a methyl or ethyl ester of a vegetable oil; and 1-10% by weight of water. In a preferred embodiment, the composition consists of 10-12% by weight of isopropylamine alkylbenzene sulfonate; 80-83% by weight of the methyl or ethyl ester of the vegetable oil; and 1-5% by weight of water. Preferably, the isopropylamine alkylbenzene sulfonate is isopropylamine dodecylbenzene sulfonate. The composition is preferably in a form of a liquid.

In another embodiment, a composition is provided for the removal of chewing gum from a surface, where the composition consists of 15-20% by weight of an isopropylamine alkylbenzene sulfonate; 10-15% by weight of a methyl or ethyl ester of a vegetable oil; and 65-75% by weight of water. In a preferred embodiment, the composition consists of 20% by weight of the isopropylamine alkylbenzene sulfonate; 15% by weight of the methyl or ethyl ester of the vegetable oil ester; and 65% by weight water. Preferably, the Isoprolamine Alkylbenzene Sulfanate is Isopropylamine Dodecylbenzene Sulfonate. Such composition is preferably in a form of a paste.

In yet another embodiment, a method is provided for the removal of paint from bristles of a paint brush, where method includes: (a) a first step of providing a composition, where said composition consists of: (i) 10-12% by weight of an Isopropylamine Alkylbenzene Sulfonate; (ii) 80-83% by weight of a methyl ester or ethyl ester of a vegetable oil; and (iii) 1-5% by weight of water; and (b) a second step of contacting the bristles and paint with said composition such that the paint separates from the bristles (the substrate). Preferably, the Isopropylamine Alkylbenzene Sulfonate is Isopropylamine Dodecylbenzene Sulfonate. Such composition is preferably in a form of a liquid.

The present invention is also directed to a method for removing paint from paint brushes and paint rollers and equipment and other surfaces.

DETAILED DESCRIPTION

In the following description, for purposes of explanation, numerous specific details are outlined to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure.

The present invention relates to a cleaning composition comprising an isopropylamine alkylbenzene sulfonate, methyl or ethyl ester of a vegetable oil, and water. The composition is an emulsifier used to remove label adhesives, bubble gum residues, along with removing wax, and silicones, paint, ink, resins, and/or polymers from a surfaces of an article onto which it is adhered, such as paintbrushes, rollers, tools, walls, floors, seats, and equipment.

In one embodiment, the composition for removing paint from paint brush bristles and paint rollers consists of 5-20% by weight of isopropylamine alkylbenzene sulfonate; 70-95% by weight of a methyl or ethyl ester of a vegetable oil; and 1-10% by weight of water.

In a preferred embodiment, the composition for removing paint from paint brush bristles and paint rollers and equipment and other surfaces consists of at least 10 to 12% by weight of the isopropylamine alkylbenzene sulfonate, at least 80 to 83% by weight of the methyl or ethyl ester of a vegetable oil, and at least 1 to 5% by weight of water.

In another embodiment, the composition includes a methyl or ethyl ester of a vegetable oil having CAS Number 67784-80-9 or CAS Number 68990-52-3, at 80-95% by weight; water having CAS Number 7732-18-5, at 5% by weight, and coupling agents, at 1-10% by weight. CAS Registry Numbers (often referred to as CAS RN® or CAS Numbers) are universally used to provide a unique, unmistakable identifier for chemical substances. CAS is a division of the American Chemical Society (ACS). A CAS Registry Number itself has no inherent chemical significance but provides an unambiguous way to identify a chemical substance or molecular structure when there are many possible systematic, generic, proprietary or trivial names. In one embodiment, the composition has a flashpoint of 300 degrees Fahrenheit, a boiling point of 220 degrees Fahrenheit, and a specific gravity of 0.8 g/ml.

In another embodiment, a composition is provided for removal of chewing gum from its adherence to a surface of an object, which includes a variety of different types of substrates, such as for example, metal, concrete, or vinyl seats, walls, and floors; and the composition consists of 15-20% by weight of isopropylamine alkylbenzene sulfonate; 10-15% by weight of an ethyl or methyl ester, wherein the ester is a vegetable oil ester; and 65-75% by weight of water.

In a preferred embodiment, the composition for removal of chewing gum from the surface of an object consists of 20% by weight of isopropylamine alkylbenzene sulfonate, 15% by weight of ethyl or methyl ester, wherein the ester is a vegetable oil ester, and 65% by weight of water.

The disclosed invention also provides a method of removing paint from bristles; wherein the method comprises (a) providing a composition consisting of (i) 10-12% by weight of an isopropylamine alkylbenzene sulfonate; (ii) 80-83% by weight of an ethyl or methyl ester, wherein the ester is a vegetable oil ester; and (iii) 1-5% by weight of water; and (b) contacting the bristles with the said composition such that the paint separates from the substrate.

As used herein, the term "clean" or "cleaning" refers to the removal of at least a portion of one or more undesired materials from a substrate or object. The substrate being cleaned may present a hard surface and may comprise agents (to be removed) selected from, but not limited to, the group consisting of label adhesives, gum residues, wax, polymers, binding agents, paint residues, or combinations thereof. Further, the substrate/object may be formed of one or more materials selected from metal, glass, plastic, ceramic, porcelain, fiberglass, stone, wood, and so on. Preferably, the object is a paintbrush.

The water may be any type of water suitable for use in a cleaning composition and can originate from several sources. For example, the water can include tap water, filtered water, bottled water, spring water, distilled water, deionized water, and/or industrial soft water. If the water is hard water comprising organics and/or dissolved mineral salts or metals, it may be purified to remove all or at least a portion of these components, which may interfere with the operation of the other components of the cleaning composition.

Alkylbenzene sulfonates are made up of benzene ring structures with hydrocarbyl substituents (or "alkyl substituents") and sulfonate groups bonded to each other at the para position on the benzene ring. The linearity of the chains of hydrocarbons enhances the biodegradable properties of said sulfonates, the hydrocarbon chain lengths of the alkyl substituents on the rings are chosen to provide a high level of washing properties. Hydrocarbyl substituents typically comprise 6, 7, 8, 9, 10, 11, 12, 13, 14, or 15 carbon atoms ("wash range") in a substantially linear arrangement, and include conventional Friedel-Krafts (Friedel-Crafts) alkylation methods can be used to attach to the benzene ring using the corresponding olefins and employing Lewis acid catalysts such as aluminum chloride and conditions known to those skilled in the art to be useful for such alkylation.

In embodiments of the invention, the isopropylamine alkylbenzene sulfonate is selected from the group consisting of C to C linear alkyl benzene and linear alkyl toluene monosulfonic acids, and at least one amine base selected from the group consisting of C to C linear alkyl benzene and linear alkyl toluene monosulfonic acids in which the amine is selected from the group consisting of n-butylamine, diisopropylamine, isobutylamine, isopropylamine, tert-butylamine, cyclohexylamine, - and n-propylamine.

In one of the preferred embodiments, isopropylamine alkylbenzene sulfonate of said composition is isopropylamine dodecylbenzene sulfonate, and the methyl or ethyl ester of a vegetable oil and water.

The composition is present in a formulation of liquid, paste, or gel.

One of the advantages of the invention comprises recovery by cleaning of expensive brushes and equipment that would otherwise have been disposed of. Brushes and equipment are returned to near new condition, removing all paint residues, binders, polymers, and solvents.

The composition of the present invention comprises dual solvent status and water washability that allows the oil-based and water-based paints to be cleaned while leaving no solvent behind. When the compositions of the invention are applied to paintbrushes to remove dried paint, the paintbrushes recover to hold more paint, especially 10-20% more, as compared to conventional cleaning compositions. Through embodiments of the invention, applicant has created a water in oil emulsion by adding water to the finished product, for all water based paints. Such helps facilitate dissolving of oil and water-based polymers and binders and also aids in the removal of suspended pigments.

In embodiments of the invention, the solvent nature of the methyl or ethyl ester of a vegetable oil component of the composition, for example, the biodiesel/soy methyl ester of the composition, allows the binders and polymers in the dirt like paint to soften or solubilize so that they can be removed from paint brushes and rollers and other surfaces. The biodiesel portion of the disclosed compositions re-wets the dried polymer and substitutes itself. The biodiesel portion does not evaporate, and it continues to penetrate and soften polymers in the paint that is on the paint brushes, paint rollers, and other surfaces. The biodiesel portion also removes adhesions because nothing adheres or sticks to biodiesel. Through embodiments of invention disclosed herein, once the binders and polymers are released from the paint brush bristles, paint rollers, spray equipment and other surfaces, they never stick again, allowing the binders and polymers to be washed or scrubbed from the paint brush bristles, paint rollers, and other surfaces.

In other cleaning compositions, the bio-solvents do not dry and they continue to penetrate because they are so wet and so thin, yet this is a disadvantage of bio-solvents, because they do not evaporate; and therefore, while a user might remove some of the polymers from the paint brush bristles by applying bio-solvents, the user now has contaminated paint brush bristles that will not clean up even with regular solvents. A hydrophobic solvent (solvent that hates water) does no good at dissolving something in a water based system. The bio-solvents of other cleaning compositions are pervasive and leave the bristles on the brush far less absorptive than before application of the other cleaning compositions, and thus the bio-solvents contaminate the next paint that is applied with the paint brush or paint roller. In other words, through other cleaning compositions, a user will not be able to hold as much paint on the paint brushes and rollers when re-using them.

Embodiments of the compositions of the disclosed invention use additives which emulsify a bio-solvent when washed in water, washing it all away. The disclosed additives have been found to behave in a manner similar to both soaps and emulsifiers in that all of the cleaning product can be washed away. Because the additives are part of the product compositions disclosed herein, the disclosed cleaning compositions that remove paint from the paint brushes and rollers and other surfaces can also themselves be removed from the paint brushes and rollers and other surfaces too. Accordingly, through embodiments of the invention, a user more efficiently removes wet and dried paint from paint brushes and paint rollers by applying the disclosed cleaning composition thereto, and the paint brushes and rollers can be cleaned because the emulsified composition can be rinsed away, the user more easily washes clean the paint brushes and paint rollers by washing away the cleaning composition by rinsing with water, thereby resulting in better cleaned and more effectively reusable paint brushes and paint rollers.

With other cleaning compositions, if a user attempted to add emulsifiers after or during the cleaning process to help remove bio-solvents from the brushes or rollers, the other cleaning compositions would not be able to remove the bio-solvent because it would have to penetrate and emulsify all of the bio-solvent after the fact. Emulsifiers do not penetrate easily or at all.

Through embodiments of the invention, the compositions disclosed herein behaves as a solvent while it is cleaning the paint brushes, rollers, equipment and other surfaces and then also washes out with water when it is done cleaning the paint brushes, rollers, equipment and other surfaces.

In a preferred embodiment, the emulsification agent is isopropylamine alkylbenzene sulfonate, which allows the polymers, binding agents, and pigments in the paint to disperse in water and leave the solvent phase and enter the water phase to be washed away from paint brushes and rollers and other surfaces when rinsed in water, in accordance with embodiments of the invention. The composition of the invention possesses water rinsability; hence, all solvent residues, including the methyl or ethyl ester of a vegetable oil and polymers are washed from the brushes.

In another embodiment, the disclosed cleaning compositions are used in combination with bio-solvents such as D-Limonene, Alpha Pinene, or other terpenoid solvents, as substitutes for the biodiesel portion of the composition. One advantage of these other natural solvents is their ability to evaporate, which assists in leaving a dry brush, after washing out the brush with at least one of the disclosed cleaning compositions.

Preferably, the composition comprises up to 51% post-consumer content, and embodiments of the invention form a recycled methyl ester or ethyl ester from a vegetable oil by using oils and alcohol as disclosed herein. Since the composition comprises no hazardous fumes—and no hazardous solvents, it can be used indoors without fear of fumes, flammability, or toxic exposure. The methyl ester of a vegetable oil and/or the ethyl ester of a vegetable oil dissolves and softens polymers and binding agents, and the isopropylamine linear alkylbenzene sulfonate allows the water in the product to initiate the emulsifying of the paint, polymers, and binders. This is the dual solvency—water and solvent-like solubility. Moreover, the cleaning composition is readily biodegradable.

Further, the cleaning composition optionally comprises additional agents. These additional agents preferably include one or more additional components, or additives, used to impart additional functionality, properties, or characteristics to the final composition. When present, the additives can be selected from the group consisting of co-solvents, complexing agents, dyes, fragrances, perfumes, pH stabilizers, acidifiers, preservatives, defoaming agents, metal protectants, antioxidants, bactericides, fungicides, disinfectants, thickeners, fine or coarse grits, polymers, buffers, delaminates, whiteners, brighteners, solubilizers, builders, corrosion inhibitors, lotions, mineral oils, cloud point modifiers, ion exchangers, suds control agents, soil removal agents, softening agents, opacifiers, inert diluents, graying inhibitors, enzymes, thickening agents and combinations thereof. The thickening agents preferably comprise cyanoacrylates, carboxymethyl cellulose agents, or gums. These gums and other thickening agents allow the product to stick or stay on vertical and horizontal surfaces for extended periods in accordance with embodiments of the invention.

Preferred embodiments of the cleaning composition disclosed herein are provided as illustrations and are not intended to limit the scope of this disclosure in any way.

EXAMPLE 1

This example illustrates a liquid formulation ("Liquid Product"), as a preferred embodiment of the cleaning composition invention disclosed herein, for cleaning paint off of paint brush bristles, paint rollers, spray equipment and other surfaces, consisting of:

TABLE 1

| Components | Weight % |
| --- | --- |
| methyl or ethyl ester (from vegetable oil esters with alcohols) | 70-95% |
| Emulsifying Agent (Isopropylamine Alkylbenzene Sulfonate) | 5-20% |
| Water | 1-10% |

The next step includes introducing an emulsifying agent, consisting of Isoproplamine Alkylbenzene Sulfonate, (preferably at 15% by weight) to the methyl ester or ethyl ester of a vegetable oil (which is preferably 81% by weight) within the container, and using a mixing apparatus to stir it (i.e., preferably within the 300-gallon barrel), and then adding water (preferably, 4% by weight) to the container, at which point a Liquid Product is formed, and the Liquid Product is bottled. This liquid form of the cleaning composition is preferably used for cleaning off wet and dried paint from paint brush bristles, paint rollers, and paint sprayers.

EXAMPLE 2

This example illustrates a paste formulation ("Paste Product"), as a preferred embodiment of the invention disclosed herein, for removing gum from the surface of an object, such as for example, a metal, concrete, or vinyl surface of a seat, wall, or floor:

TABLE 2

| Components | Weight % |
| --- | --- |
| Ethyl or methyl ester (from vegetable oil esters with alcohols) | 15% |
| Emulsifying Agent (dodecylbenzene isopropylamine sulfonate) | 20% |
| Water | 65% |

The method of preparation of the paste formulation comprises the steps of introducing used cooking oil, after heating it to approximately 150 degrees F., to an esterification reaction, after which allowing time for separation and settlement, to form a top product and a bottom product, as detailed in Example 1 above, where the top portion is a methyl ester or ethyl ester of a vegetable oil and the bottom portion is a byproduct glycerine. The method then includes running the methyl ester or ethyl ester of a vegetable oil through a tube filled with wood shavings for the first wash, and then a second washing of the product is with water (i.e., exposure to water by spraying water lightly over it). The method includes allowing (preferably for 24 hours) for water to settle and then draining the water from the container, and mixing in an emulsifying agent consisting of isopropylamine alkylbenzene sulfonate (20% by weight) with a mixing apparatus, and then adding water (65% by weight) to the mixture, which results in a paste product that is ready for use in removing gum from the surface of an object, such as for example, a metal, concrete, or vinyl surface of a seat, wall, or floor by applying the paste product to the intended surface.

EXAMPLE 3

This example illustrates a gel formulation ("Gel Product"), as a preferred embodiment of the invention disclosed herein consisting of the following components (in wt %):

| Components | Weight % |
| --- | --- |
| methyl or ethyl ester of a vegetable oil | 65% |
| Emulsifying Agent (dodecylbenzene isopropylamine sulfonate) | 20% |
| Water | 15% |

The method of preparation of the gel formulation ("Gel Product") comprises the steps of the steps of introducing cooking oil (preferably used cooking oil), after heating it to approximately 150 degrees F., to an esterification reaction, after which allowing time for separation and settlement, to form a top product and a bottom product, as detailed in Example 1 above, where the top portion is a methyl ester or ethyl ester of a vegetable oil and the bottom portion is a byproduct glycerine. The top portion being a methyl or ethyl ester of a vegetable oil and the bottom portion being a byproduct glycerin. The method then includes running the methyl ester or ethyl ester of a vegetable oil through a tube filled with wood shavings (preferably from a hardwood) for the first wash, then washing the product with water (i.e., exposure to water by spraying water lightly over it). The method includes allowing (preferably for 24 hours) for water to settle and then draining the water from the container, and mixing in an emulsifying agent consisting of isopropylamine alkylbenzene sulfonate (20% by weight) with a mixing apparatus, and then adding water (15% by weight) to the mixture, which results in a Paste Product, and then the Paste Product is ready for use.

Through embodiments of the disclosed invention, the cleaning composition cleans greasy engines and car parts. It also cleans greasy kitchen backsplashes and other metal surfaces. In addition, the cleaning composition cleans barbecue grills as well as cleans oil stains on concrete. The cleaning composition is also known to clean greasy hands, remove label adhesives, and removes grease from fabrics.

Although the present invention has been illustrated and described only with respect to some preferred embodiments, it is clear that reasonable changes and modifications will occur if those skilled in the art have read and understood the present specification.

The claimed invention is:

1. A composition for removing paint from paint brush bristles comprising:
   a) about 5-20% by weight of an isopropylamine alkylbenzene sulfonate;
   b) about 65-95 by weight of an ethyl or methyl ester of a vegetable oil including methyl soyate, and rapeseed oil methyl ester;
   c) about 1-15% by weight of water;
   d) optionally an additional solvent selected from the group consisting of d-limonene, alpha pinene, and other terpenoid solvents; and
   e) optionally a thickening agent selected from the group consisting of cyanoacrylates, carboxymethyl cellulose agents or gums.

2. The composition of claim 1, wherein said composition comprises about 16-20% by weight of the isopropylamine alkylbenzene sulfonate, about 70-83% by weight of the methyl or ethyl ester, and about 1-4% by weight water.

3. The composition of claim 1, wherein said composition comprises about 20% by weight of the isopropylamine alkylbenzene sulfonate, about 65% by weight of the methyl or ethyl ester, and about 15% by weight water.

4. The composition of claim 1, wherein said composition comprises from 80 to 83% by weight of the ethyl or methyl ester of a vegetable oil.

5. The composition of claim 3, wherein said composition comprises from 1 to 5% by weight of water.

6. The composition of claim 4, wherein said composition is a liquid.

7. The composition of claim 1, wherein the isopropylamine alkylbenzene sulfonate is isopropylamine dodecylbenzene sulfonate.

8. A composition for removal of chewing gum from the surface of an object, the composition comprising:
   a) about 16-20% by weight of an isopropylamine alkylbenzene sulfonate;
   b) about 10-15 by weight of an ethyl or methyl ester of a vegetable oil including methyl soyate, and rapeseed oil methyl ester;
   c) about 65-75% by weight of water;
   d) optionally an additional solvent selected from the group consisting of d-limonene, alpha pinene, and other terpenoid solvents; and
   e) optionally a thickening agent selected from the group consisting of cyanoacrylates, carboxymethyl cellulose agents or gums.

9. The composition of claim 8, wherein the composition comprises 20% by weight of the isopropylamine alkylbenzene sulfonate, 15% by weight of the methyl or ethyl ester of the vegetable oil ester, and 65% by weight water.

10. The composition of claim 8, wherein the isopropylamine alkylbenzene sulfonate is isopropylamine dodecylbenzene sulfonate.

11. The composition of claim 8, wherein said composition is a paste.

12. A method for removing paint from paint brush bristles, said method comprising
   a) providing a composition according to present claim 1; and
   b) contacting the paint brush bristles with the composition such that the paint separates from the bristles.

13. The method of claim 12, wherein the composition comprises about 10-12% isopropylamine alkylbenzene sulfonate, about 80-83% by weight of a methyl ester or ethyl ester of a vegetable oil; and about 1-5% by weight of water.

14. The composition of claim 1 further comprising an additive selected from the group consisting of complexing agents, dyes, fragrances, perfumes, pH stabilizers, acidifiers, preservatives, defoaming agents, metal protectants, antioxidants, bactericides, fungicides, disinfectants, fine or coarse grits, polymers, buffers, delaminates, whiteners, brighteners, solubilizers, builders, corrosion inhibitors, lotions, mineral oils, cloud point modifiers, ion exchangers, suds control agents, soil removal agents, softening agents, opacifiers, inert diluents, graying inhibitors, and enzymes.

15. The composition of claim 8 further comprising an additive selected from the group consisting of complexing agents, dyes, fragrances, perfumes, pH stabilizers, acidifiers, preservatives, defoaming agents, metal protectants, antioxidants, bactericides, fungicides, disinfectants, fine or coarse grits, polymers, buffers, delaminates, whiteners, brighteners, solubilizers, builders, corrosion inhibitors, lotions, mineral oils, cloud point modifiers, ion exchangers, suds control agents, soil removal agents, softening agents, opacifiers, inert diluents, graying inhibitors, and enzymes.

* * * * *